United States Patent Office 3,397,669
Patented Aug. 20, 1968

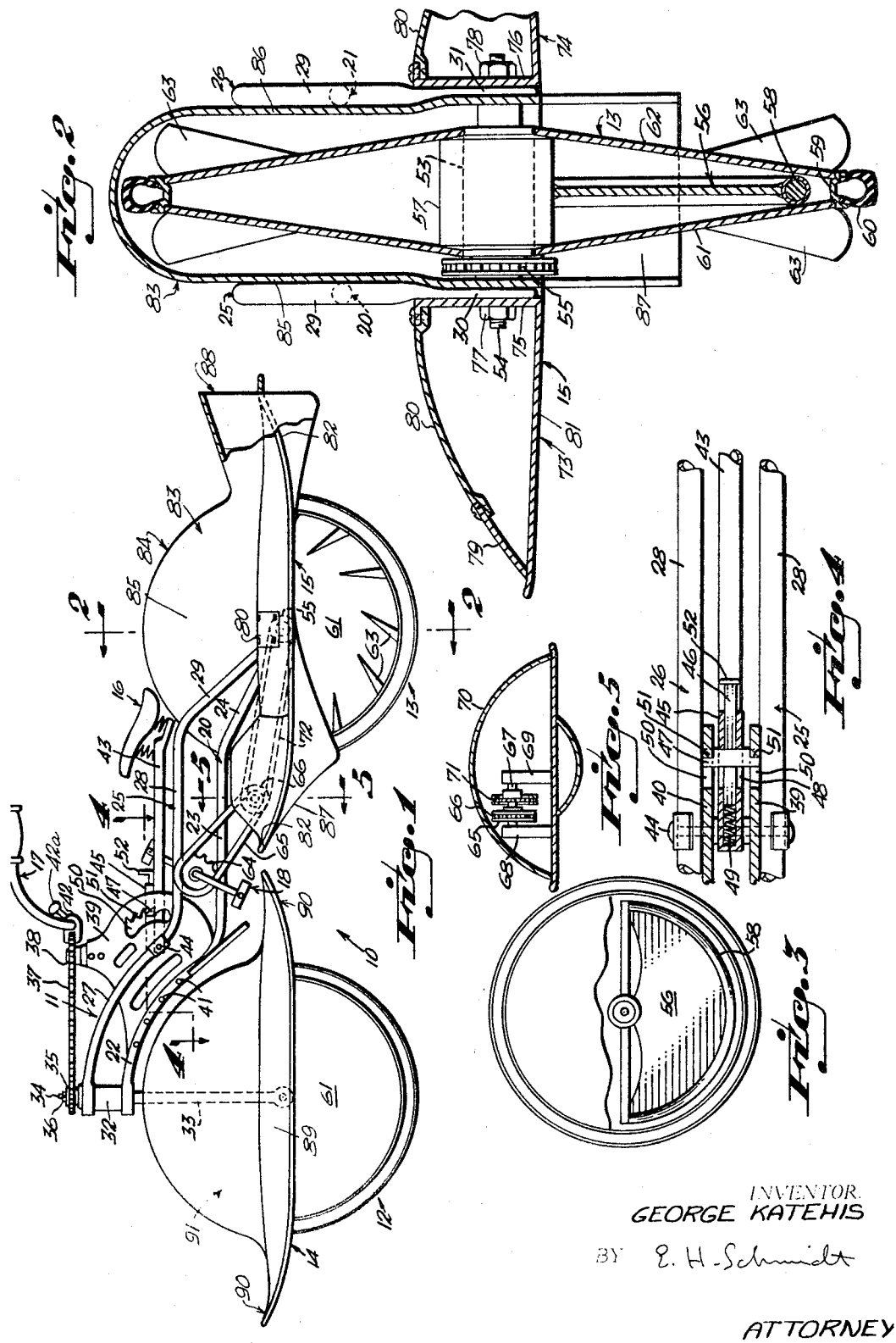

3,397,669
AMPHIBIOUS VEHICLE
George Katehis, Miami, Fla.
(General Delivery, Summerland Key, Fla. 33042)
Filed Mar. 30, 1967, Ser. No. 627,213
7 Claims. (Cl. 115—2)

ABSTRACT OF THE DISCLOSURE

An amphibious bicycle having wheels with ballast means comprising a segment of a disc suspended within the wheels from the axles of the bicycle. Said bicycle also having buoyancy floats extending fore and aft of said wheels and secured to the frame adjacent to said axles.

---

This invention relates to amphibious vehicles and is directed particularly to improvements in pedal-actuated bicycles of the type capable of travel both on land and on water.

The principal object of this invention is to provide an amphibious bicycle of the above nature which will be substantially equally manouverable and efficient in operation on land and in water.

A more particular object is to provide an amphibious bicycle of the character described which utilizes front and rear pontoons supported at axle level at the wheels for floatation during use in water, and which includes means for raising the seat for better weight distribution of the rider between the front and rear wheels while traveling in water.

Yet another object of the invention is to provide an amphibious bicycle of the above nature wherein propulsion over land is effected by the use of ordinary pneumatic tires on standard size wheels, and wherein propulsion over water is effected by the use of circumferentially spaced paddle fins projecting from each side of the rear wheel.

Yet another object is to provide an amphibious bicycle of the above nature including heavy segmental keel discs co-axially journalled within the front and rear wheels to depress the center of gravity of the device for improved stability while traveling in water.

Another object is to provide an amphibious bicycle of the above nature which is readily adaptable to power driven operation instead of or in conjunction with pedal operation.

Yet another object is to provide an amphibious bicycle of the character described which will be simple in structure, inexpensive to manufacture and dependable and durable in use.

Other objects, features and advantages of the invention will be apparent from the following description when read with reference to the accompanying drawings.

In the drawings, wherein like reference numerals denote corresponding parts through out the several views:

FIG. 1 is a side elevational view of an amphibious bicycle embodying the invention;

FIG. 2 is a vertical cross-sectional view taken along the line 2—2 in FIG. 1 in the direction of the arrows;

FIG. 3 is a side elevational view of the rear bicycle wheel, a portion of the side wall thereof being broken away to illustrate details of the pendulous segmental keel;

FIG. 4 is a horizontal cross-sectional view, taken along the line 4—4 of FIG. 1 in the direction of the arrows, illustrating mechanical details of the seat elevating mechanism, and FIG. 5 is a vertical cross-sectional view taken along the line 5—5 of FIG. 1 in the direction of the arrows and illustrating details of the chain-drive mechanism.

Referring now in detail to the drawings, 10 designates, generally, an improved amphibious bicycle for land and water travel, and embodying the invention. The vehicle comprises a frame, generally indicated at 11, front and rear wheels 12 and 13, respectively, front and rear pontoon structures 14, 15 at axle level with the front and rear wheels 12 and 13, respectively, a vertically-adjustable seat 16, a steering handle 17, and a pedal-actuated crank drive mechanism 18.

The frame member 11 comprises laterally-spaced lower frame bar members 20, 21, each comprising a forwardly and upwardly extending arcuate front portion 22, a horizontally extending intermediate portion 23 and a downwardly-inclined rear portion 24. The frame member 11 further comprises upper frame bars 25, 26 having forwardly and upwardly-extending arcuate portions 27 in vertically aligned spaced relation above the front arcuate frame bar portions 22, intermediate portions 28 in spaced alignment above the intermediate frame bar portions 23 and downwardly-inclined rear portions 29 converging with the terminal ends of the downwardly-inclined rear portions 24 of the lower frame bars 20, 21 to provide laterally-spaced frame end portions indicated at 30, 31, in FIG. 2, between which the rear wheel 13 and its associated pontoon structure 15 is journalled and supported, as is hereinafter more particularly described.

At the front of the frame 11, a front wheel fork bearing 32 is secured in vertical relation between the lower frame bar members 20, 21 and the upper frame bar members 25, 26. Journalled in the front wheel bearing 32 is a wheel fork 33, carrying the front wheel 12. The fork 33 is formed with an upper end, threaded stud 34, carrying a sprocket wheel 35 secured thereto as by a nut 36. The sprocket wheel 35 engages a sprocket chain 37 extending to the rear and in intermeshing engagement with a steering handle sprocket 38.

The steering handle sprocket 38 is journalled between a pair of laterally-spaced, vertically-extending frame plates 39, 40 extending upwardly from between the front upwardly-extending portions 22 and 27 of the upper and lower frame bars, and fixed there-against, from the inside, as by bolts or rivets 41. The steering handle 17 is centrally fixed, by means of a bracket 42, to the steering handle sprocket 38 for turning said steering handle sprocket and, consequently, through the sprocket chain 37, turning the wheel fork 33 to enable steering of the vehicle as in an ordinary bicycle. Preferably, the above-described handle chain drive mechanism is enclosed by a housing (not illustrated).

As illustrated in FIGS. 1 and 4, the adjustable seat 16 is spring-mounted at the rear end of an elongated seat support bar 43, the front end of which terminates between the upper frame bars 25, 26 at a position near the lower end portions of the front arcuate portions 27 thereof, whereat it is journalled as by a journal pin 44. It will be noted that the forward end of the seat support bar 43 also extends between the rearward portions of the frame plates 39, 40. As a means for adjustably positioning the seat support bar 43 in a plurality of upwardly-swung positions, selectively, with respect to the vehicle frame so as to adjustably raise the seat 16, the forward end of the seat support bar 43 is provided with a sleeve 45 fixed thereupon and slidably arranged within which is a pawl rod 46 carrying a triangular pawl 47 transversely fixed about midway along the length of said rod and extending sidewardly through elongated opening 48 of said sleeve. The sleeve 45 has constrained within the outer or forward end thereof a compression spring 49, serving to urge the pawl rod 46 to its outer or rearwardmost position, as limited by the rear end portions of the elongated openings 48 in the sleeve member 45. The triangular pawl 47 also extends sidewardly at each side through side openings 50 in the frame plates 39, 40, said side openings being defined along the rearward edges thereof by arcuately-arranged ratchet teeth 51 complemental in shape with that of the triangular pawl 47, and adapted to receive the outer ends of said pawl in selective engagement therewith. With this arrangement, it will be apparent that either by pushing in on the outer end handle portion 52 of the pawl rod 46 to disengage the triangular pawl from the particular ratchet tooth 51 within which it is seated, or by pulling up on the seat bar 43, said triangular pawl can be re-positioned from a lower to an upper position along said ratchet teeth to correspondingly elevate the seat as may be desired. In order to lower the seat again, it is only necessary to push in upon the pawl rod 46 to disengage its pawl 47 with respect to the ratchet teeth 51, to permit lowering of the seat support bar 43 and engagement of said triangular pawl with a lower one of said ratchet teeth. Preferably, the steering handle 17 is adjustably in its bracket 42 by means of a hand operated clamp nut 42a for repositioning from time to time as may be desired after repositioning the seat.

The rear wheel 13, as described above and as illustrated in FIG. 2, is journalled between the frame rear end portions 30, 31 and comprises the usual coaster brake, indicated at 53, axle 54 and drive sprocket 55. In addition, means is provided for substantially lowering the center of gravity of the wheel, and hence the center of gravity of the amphibious bicycle to improve vertical stability while travelling in water. To this end, a heavy, substantially semi-circular keel disc 56 is pendulously journalled about the coaster brake 53 as by a bearing 57. The keel disc 56 may be made of steel, for example, having a weighted peripheral rim 58, which rim may be tubular and filled with a heavy metal such as lead. Although only one such peripheral rim is shown, two or more adjacent weighted rims could be used if additional weight is necessary.

The rear wheel 13 further comprises an outer rim 59 carrying the usual pneumatic tire 60 for travel over land, and opposed disc-like side walls 61, 62 extending between the coaster brake 53 and said rim and providing a watertight housing for the keel disc 56.

As illustrated in FIGS. 1 and 2, the outsides of the rear wheel side walls 61, 62, near the outer edges thereof, are formed with a plurality of pairs of opposed, sidewardly outwardly-extending triangular propulsion fins 63, peripherally spaced about the wheel.

As illustrated in FIG. 1, the propulsion fins 63 are set at such an angle that they extend substantially vertically upwardly when positioned approximately thirty circular degrees past their lowermost position as the wheel 13 rotates in its anti-clockwise direction. With such positioning of the fins, not only is a lifting effect created by their downward movement as they enter the water, but a greater forward thrust is created at the rear of the driven wheel where the fins leave the water, with minimal splashing and lifting of the water where they leave the water at the rear of the vehicle.

As illustrated in FIG. 1, the pedal drive member 18 is journalled between the intermediate portions 23, 28 of the upper and lower frame bar members near the front ends thereof, and carries a sprocket wheel 64 at one side. The sprocket wheel 64 drives a sprocket chain 65 transmitting drive power to a first intermediate sprocket wheel 66, carried by an idler shaft 67, journalled at its ends between stanchions 68, 69 fixed within a gear or motor housing 70, located just forwardly of the rear wheel 13 and supported by the rear pontoon structure 15, as is hereinafter described (see FIG. 5). The idler shaft 67 also carries a second sprocket wheel 71 engaging a sprocket chain 72 trained over the rear wheel drive sprocket 55. It will thus be apparent that pedal power applied to the pedal drive member 18 will be transmitted through the sprocket chains 65 and 72 and the idler shaft 67 and their associated sprocket wheels to drivingly turn the rear wheel anti-clockwisely.

As illustrated in FIGS. 1 and 2, the rear pontoon structure 15 comprises a pair of hollow side wing members 73, 74, having opposed, substantially vertical inner wall portions 75, 76, respectively, removably secured with respect to the vehicle framework at about the level of the rear wheel axle by means of axle nuts 77, 78 at each side of the coaster-brake axle mechanism. As illustrated in FIGS. 1 and 2, the upper walls 79 of the rear pontoon structure 15 are provided with watertight removable access plates 80 for assembly purposes. The bottom walls 81 of the rear pontoon structure 15 are substantially flat, terminating at each end with arcuately upwardly-extending portions 82, converging with their respective upper wall portions 79.

A streamlined enclosure 83 is also provided for the upper portion of the rear wheel 13 to prevent water being carried up into the area of the rider while travelling in water. The streamlined enclosure 83 is integrally formed with a semi-circular upper housing portion 84, defining opposed side walls 85, 86, the opposed lower central end portions of which are fixed with respect to the rear wheel axle 59 at the insides of the upper frame bars 25, 26. The lower front end portion of the enclosure 83 is integrally formed with a streamlined bottom wall 87 extending downwardly arcuately between the forward ends of the pontoon side wing members 73, 74 and preferably integrally formed therewith and with the gear or motor housing 70. The rear end portion of the bottom wall 87 is open for passage of the rear wheel 13. This bottom wall 87 not only serves to divert seaweed and the like from the gear drive mechanism, but also serves to create a trough of water where the propulsion fins enter the water, to reduce the reactive force at this portion of propulsion wheel travel. The rear end portion of the streamlined enclosure or rear wheel housing 83 is flared outwardly and upwardly, as indicated at 88 in FIG. 1, to provide a chute directing water splashed upwardly by the rear wheel fins 63 to the rear of the vehicle.

The front wheel structure 12 is similar to that of the rear wheel in that it also is provided with a pendulous keel (not illustrated) and enclosing side walls 61, 62. The front pontoon structure 14 similarly comprises opposed, hollow side wing members 89, terminating at each end in arcuately upwardly-extending end portions 90 integrally formed with a semi-circular upper wheel housing portion 91.

In use on land, the vehicle operates as an ordinary bicycle. When travelling in water, the pontoon structures are of such buoyancy as will keep the craft afloat at a level slightly above the wheel, axles, the disc keels 56 serving to maintain the craft erect in the water. For best stability upon mounting the vehicle in water, the front wheel will first be turned so that its pontoon will be substantially perpendicular to the longitudinal axis of the vehicle. The front wheel will be kept in this position until the rider has achieved some forward speed, after which the front wheel can be turned straight ahead with stability sufficiently enhanced by the balancing action of the rider in continuation with the forward velocity of the vehicle to maintain the upright position as in riding a bicycle on land. With such structure, the rider will readily be able to maintain his upright position in the water while standing still. When moving through the water, vertical stability is substantially increased, so that turns can readily be accomplished and stability maintained even in fairly rough water. It will further be apparent that the driver will be able to make the transition from travel on land into water or vice versa without stopping. The vertical positioning of the seat 16 can readily be adjusted while riding, as described above, for best comfort and vehicle stability.

While I have illustrated and described herein only one form in which my invention can conveniently be embodied in practice, it is to be understood that this form is given by way of example only and not in a limiting sense. For example, while I have shown and described a pedal operated vehicle, it will be apparent that it could be motorized by the inclusion of a gasoline or electric motor enclosed within the housing. Also, although only one rear propulsion wheel is shown, two could be used in tandem, as in a tricycle, for improved stability. Alternatively, instead of using a bicycle frame, keeled propulsion wheels embodying the invention could be journalled in a buoyant float structure in the form of a boat hull, to provide an amphibious boat. The invention, in brief, comprises all the modifications and embodiments coming within the' scope and spirit of the following claims.

What I claim as new and desired to secure by Letters Patent is:

1. An amphibious bicycle comprising, in combination, a bicycle frame, a front wheel journalled at the front end of said frame and a rear wheel journalled at the rear end of said frame, pedal crank drive means journalled with respect to said frame at a position intermediate the ends thereof, mechanism drivingly interconnecting said pedal drive crank drive means and said rear wheel, mechanism for steering said front wheel, horizontally-extending front and rear pontoon structures fixed at substantially axle level with respect to said front and rear wheels, respectively, and means pendulously journalled with respect to said wheel axles and arranged within said wheels for depressing the over-all center of gravity of said bicycle structure.

2. An amphibious bicycle as defined in claim 1 wherein said center of gravity depressing means comprises a pair of semi-circular circumferentially weighted keel members, the center of curvature portions of which are journalled, one each, with respect to said wheel axles.

3. An amphibious bicycle as defined in claim 1 wherein said rear wheels comprise opposed side wall portions enclosing said center of gravity depressing means, and propulsion fins fixed with respect to the outsides of each of said side walls and peripherally spaced thereabout.

4. An amphibious vehicle as defined in claim 3 wherein said fins are substantially planar in form and secured with respect to said side walls along edges thereof extending at an angle of approximately thirty circular degrees in the clockwise direction with respect to a radii extending to the outer ends of said edges.

5. An amphibious vehicle as defined in claim 3 including a semi-circular housing structure for each of said wheels and centrally arranged with respect to their pertaining pontoon structures, the housing structure of said rear wheel being formed with an outwardly-flared rear end portion serving as a chute directing propelled water to the rear of the bicycle while travelling in water.

6. An amphibious bicycle as defined in claim 5 including a bicycle seat and mechanism for adjustably positioning said seat vertically with respect to a central portion of said frame.

7. An amphibious bicycle as defined in claim 6 wherein said seat positioning mechanism comprises a seat support bar swingably journalled at one end to said frame and carrying said seat at its other end, a pawl transversely arranged with respect to said seat support bar at a position intermediate the ends thereof and movable between limit positions axially spaced therealong, means resiliently constraining said pawl to one of said limit positions, and a ratchet teeth fixed with respect to said frame and adapted to be engaged, selectively, by said pawl when in said one of said limit positions, and means for manually moving said pawl from said one to the other of said limit positions.

References Cited

UNITED STATES PATENTS 537,921   4/1895   Fernandez _____ 115—2

ANDREW H. FARRELL, *Primary Examiner.*